United States Patent [19]

Gain et al.

[11] Patent Number: 4,708,836
[45] Date of Patent: Nov. 24, 1987

[54] PROCESS FOR PRODUCING AN ARTIFICIAL CRANIUM AND A PROSTHETIC HEAD

[75] Inventors: Robert Gain, Chelles; Jacques Simon, Ivry; André Pasturel, Paris; Marc Roger, Maisons Alfort, all of France

[73] Assignees: Commissariat a l'Energie Atomique; L'Etat Francais, both of France

[21] Appl. No.: 841,821

[22] Filed: Mar. 20, 1986

[30] Foreign Application Priority Data

Mar. 22, 1985 [FR] France .................... 85 04284

[51] Int. Cl.⁴ .................. B29C 33/40; G09B 23/06; G09B 23/30
[52] U.S. Cl. ..................... 264/40.1; 264/222; 264/227; 264/DIG. 30; 434/270; 434/274
[58] Field of Search ............... 264/220, 221, 222, 225, 264/226, 227, 40.1, 219, DIG. 30; 434/270, 274; 623/16; 446/391, 395

[56] References Cited

U.S. PATENT DOCUMENTS

| | | | |
|---|---|---|---|
| 2,017,216 | 10/1935 | Marcus | 425/116 |
| 3,009,265 | 11/1961 | Bezark | 434/270 |
| 3,124,506 | 10/1965 | Corbin | 424/55 |
| 3,980,269 | 9/1976 | Maurino et al. | 264/313 |
| 4,209,919 | 7/1980 | Kirikae | 434/270 |

FOREIGN PATENT DOCUMENTS

| | | |
|---|---|---|
| 0004844 | 10/1979 | European Pat. Off. . |
| 1704372 | 5/1971 | Fed. Rep. of Germany . |
| 2733501 | 2/1979 | Fed. Rep. of Germany ...... 434/270 |
| 2334160 | 1/1977 | France . |
| 2332846 | 6/1977 | France . |
| 0868821 | 9/1981 | U.S.S.R. .................... 434/270 |

OTHER PUBLICATIONS

Catalog: Authentic Anatomical Reproductions and Patient Simulators; Medical Plastics Lab, Inc.

*Primary Examiner*—Jan H. Silbaugh
*Assistant Examiner*—J. F. Durkin

[57] ABSTRACT

A cranium is firstly produced form an epoxy resin, whose thickness is adapted so that the compressive strength at a given point is the same as at the corresponding point of a real cranium. This is followed by the fitting of the soft parts, i.e. the brain, eyeballs, flats of the ear and nasal pyramid. These members are made from a silicone to which a variable quantity of oil has been added to ensure that their hardness is the same as that of the corresponding real organs. The cranium is then placed on a support permitting the correct orientation thereof in the mould where the skin is cast.

15 Claims, 26 Drawing Figures

FIG.7
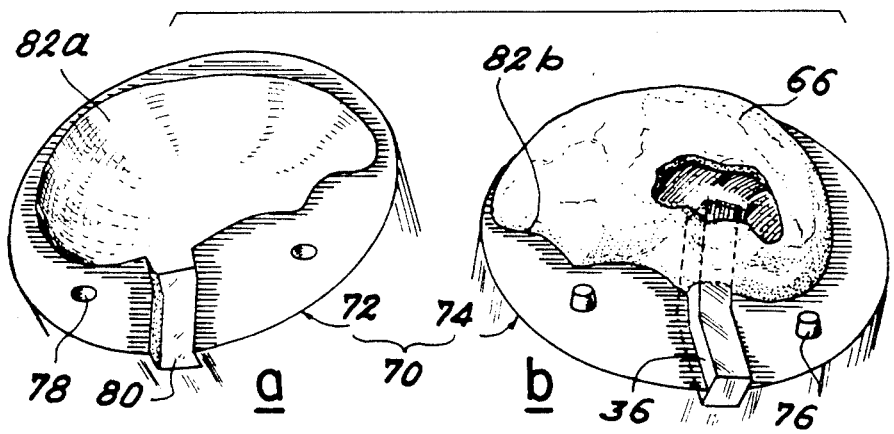
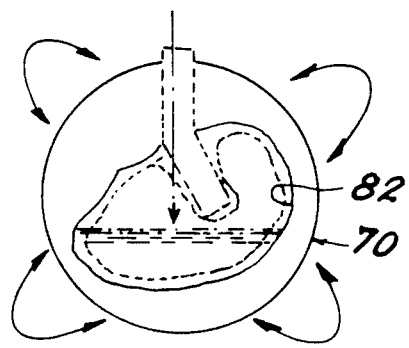
FIG.8
FIG.9
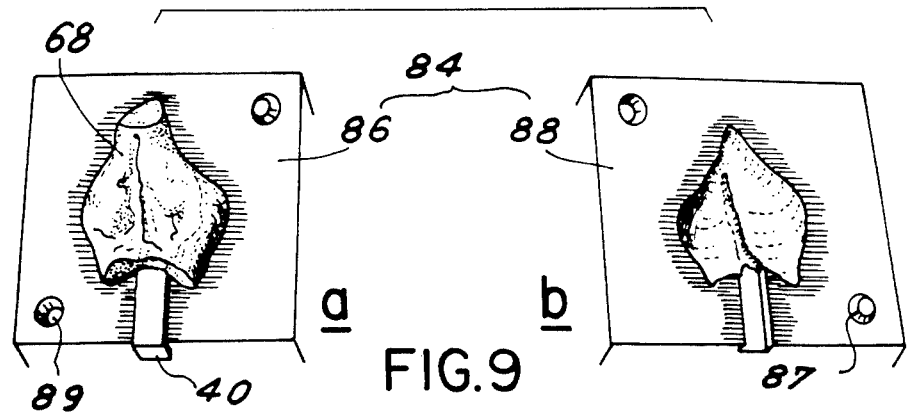

PROCESS FOR PRODUCING AN ARTIFICIAL CRANIUM AND A PROSTHETIC HEAD

BACKGROUND OF THE INVENTION

The present invention relates to an artificial cranium and to a prosthetic head produced from said cranium, as well as to a process for producing said cranium and said head.

In the accident prevention field, at present ever-increasing efforts are being made to study the mechanical behaviour of the human body and particularly the bones in the case of an impact or shock. This not only serves to determine all the consequences due to an impact at a given point but also to study the effectiveness of certain protective measures. As the head is a very sensitive part of the body, particular attention is paid to it.

The invention has a very interesting application in the study of the effectiveness of helmets for motorcyclists and also motorists in the case of racing cars or other competitive vehicles, such as those used in gocarting and the like.

In the automobile industry, use is made of dummies with synthetic heads for simulating accidents. However, these heads are made from wood or metal and consequently do not have the same mechanical characteristics as a true head or a true human skull. Moreover, it is difficult to carry out experiments on real human heads because, following the death of the person in question, bones harden and do not have the same mechanical characteristics as a living bone.

There are at present artificial craniums used more particularly for pedagogic purposes. However, said craniums are made from flexible plastics and are generally in two parts, which are assembled along a plane using mortises and tenons. The joining plane is chosen so as to make it easy to construct the two parts of the cranium (cavities which are largely open to the outside and no undercuts). It is clear that although such craniums are satisfactory for the study of the anatomy, they do not make it possible to carry out mechanical tests for shock resistance, on the one hand because the materials chosen have characteristics which differ widely from those of true bones and on the other hand because the assembly plane of the two parts in no way corresponds to what occurs anatomically.

There are also prosthetic heads for the study of injuries caused by automobile accidents. However, such heads are constituted by a simple external envelope substantially reproducing the external appearance of a true human head within which are placed metal structures in honeycomb form. These means make it possible to determine at what points the most severe stresses occur or to establish shock probability cards or charts, but do not have the same biomechanical behaviour as a real human head.

SUMMARY OF THE INVENTION

The object of the present invention is to eliminate these disadvantages by proposing an artifical cranium and a prosthetic head produced from same cranium having the same mechanical behaviour and shape characteristics as a fresh cranium and a real head respectively. According to the invention, said cranium is made from a material, whose thickness is such that the compression strength at a point on the artificial cranium is close to the compression strength at the corresponding point of the fresh cranium. In the preferred embodiment, said material is an epoxy resin.

When used in the present text, the expression "fresh cranium" means the cranium of a living human or animal, or the cranium removed shortly after death, so that its mechanical characteristics are not modified.

The expression "shape characteristics" means that the artificial cranium must have the same shape and dimensions as a real human cranium and also the cavities corresponding to the natural cavities of a real human or animal cranium must have the same shape and dimensions as these, except that the thickness of the material used must be adapted for the reason given hereinbefore.

In the preferred embodiment, the external shape of the artificial cranium is identical to that of the fresh cranium. As the thickness of the material constituting the artificial cranium differs from that of the real bone, the internal cavities do not exactly reproduce the cavities of the fresh cranium. However, this is not prejudicial because the differences are small (a few millimeters).

According to another feature of the invention, the cranium comprising the cranial case and the lower jawbone, so that the material mass constituting the walls of the cranial case is homogeneous and continuous.

The invention also relates to a process for producing an artificial cranium by moulding a first material in a mould which is in several parts, said cranium having at least one cavity, wherein it comprises the following stages:

(a) determining the compression modulus of elasticity at different points of a fresh cranium, (b) calculating the equivalent thicknesses of the first material, so that the compression strength is the same at each considered point, (c) producing a model cranium with the thus calculated equivalent thicknesses, said model cranium having a cavity corresponding to that of the cranium to be produced, (d) taking an external impression of the model cranium in two stages in order to obtain a two-part mould, (e) taking an impression of the cavity of the model cranium in order to obtain a first core, stages (d) and (e) being performed simultaneously, (f) eliminating the model cranium, (g) taking an impression of the first core to obtain a countermould, (h) producing in said countermould a second core of a second material, which can be selectively eliminated with respect to the first, (i) placing the second core in one of the mould parts by orienting it using appropriate positioning means, (j) closing the mould by assembling its different parts, (k) introducing the first material into the mould, (l) allowing the first material to harden, (m) separating the different parts of the mould, and (n) eliminating the second core.

Preferably, the first material is an epoxy, resin, whilst the second material is a material which can be eliminated by dissolving in a solvent, which neither attacks nor dissolves the first material.

According to another feature of this process, stage (a) comprises:

(1) sampling a bone test piece of substantially cylindrical section and with an axis substantially perpendicular to the bone wall at each point of the fresh cranium, whose compression modulus of elasticity is to be determined, (2) producing from said bone test piece, a test piece having the shape of a regular cylinder with the same cross-section as the bone test piece by fixing to the latter at least one member made from a material whose compression modulus of elasticity is known, (3) subjecting the test piece to a compression test, and (4) determining the compression modulus of elasticity of the bone test piece on the basis of the results of this test.

The process is more particularly applicable in the case of producing an artificial human cranium, where said cavity is a nasal or cerebral cavity.

In the case where the cranium to be produced has at least one orbital cavity, the process also comprises the following stages, performed before stage (j) and comprising (o) producing an orbital core from a third material, (p) mounting a rigid member having a tapped hole on the orbital core, (q) placing the orbital core within one of the parts of the mould, the rigid member being received in a recess provided for this purpose, and (r) fixing the orbital core with the aid of a screw entering from the outside of said mould part, through a hole provided for this purpose and extending into said tapped hole.

Still in the case where the cranium to be produced has at least one orbital cavity, during the extraction of the finished artificial cranium, i.e. following the aforementioned stage (1), the screw is removed and the orbital core extracted from the orbital cavity.

In the case where the artificial cranium to be produced has a lower jawbone and a cranial case with at least one cavity (this is the case with human craniums, whereof the cranial case has a nasal cavity and a cerebral cavity), the lower jawbone and cranial case are produced separately by moulding.

Preferably, the material from which the model cranium is made is a wax, which has the advantage of being easy to work.

The invention also relates to a prosthetic head. According to the main feature of said head, it comprises a cranium like that referred to hereinbefore.

According to another feature of this head, it also comprises at least one soft part with the same shape and mechanical behaviour characteristics as the corresponding soft part of a real head.

In the present description, the term "soft parts" is used to describe those parts of the head other than the bones, i.e. essentially the brain, eyeballs, ears, nasal pyramid and skin. These various soft parts have the same dimensions (in the case of the skin the same thickness) as the corresponding soft parts of the real head and are made from a material having the same mechanical behaviour (essentially the same hardness) as the real soft parts. In the preferred embodiment, said material is a silicone mixed with oil.

The invention also relates to a process for producing said prosthetic head. According to the main feature of this process, it comprises the following stages:

(5) producing an artificial cranium by the aforementioned process, (6) placing said cranium in a two-part mould by orienting it using a positioning means, (7) pouring a material simulating the skin into the mould, (8) allowing said material to harden, (9) separating the two parts of the mould, and

(10) extracting the thus finished head.

Generally, this process comprises a supplementary stage, performed before stage (6) and which consists of placing, at a given point of the cranium, a soft part made from a material with the same shape and mechanical strength characteristics as the corresponding soft part of a real head.

Preferably, the material from which said soft part is made is a silicone mixed with oil and the oil quantity in the mixture is adjusted so that the hardness of said soft part is identical to that of the corresponding soft part of a real head.

If the cranium used has an occipital foramen, the positioning means used is a support with at one of its ends a boss, whose shape corresponds to that of the occipital foramen and at the other end orientation means able to cooperate with the corresponding orientation means provided in the mould.

The production of said support can comprise the following stages:

producing a substantially cylindrical model support having at one of its ends a shape such that the cranium can rest on said model support, when the latter is in the vertical position, with the same orientation as a real cranium with respect to a neck and at the other end at least one orientation means, taking an impression of the model support in two parts in order to produce a countermould, and producing the support by moulding its constituent material in the countermould.

According to another feature of the process, the production of the mould comprises the following stages:

producing a cranium having the same external appearance as that used for producing the prosthetic head, placing said cranium on a positioning means identical to that used in stage (6), externally covering said cranium and said positioning means with a material which can be sculptured, sculpturing said material to give it the shape and external dimensions of a real head, thus forming a model head, and taking an impression of said model head in two stages, so as to produce the mould.

Finally, said process can comprise a supplementary stage, performed before stage (7), consisting of placing a measuring sensor at a given point on the head. This sensor (there can be several of them) makes it possible to determine the stresses or accelerations undergone at a given point on the head under the effect of an external stress (shock, noise, etc.).

BRIEF DESCRIPTION OF THE DRAWINGS

The invention is described in greater detail hereinafter relative to non-limitative embodiments and with reference to the attached drawings. wherein show:

FIGS. 7a and 7b: Diagrammatic perspective views illustrating the countermould used for producing the cerebral core.

FIG. 8: A diagrammatic sectional view showing how the cerebral core is produced by agitation of the countermould illustrated in FIGS. 6a and 6b.

FIGS. 9a and 9b: Diagrammatic perspective views illustrating the countermould used for producing the core corresponding to the nasal cavity.

DETAILED DESCRIPTION OF THE PREFERRED EMBODIMENTS

In order to produce artificial craniums having mechanical characteristics very close to those of a human head, uniaxial compression tests were firstly performed on test pieces taken from different points of fresh human craniums. The measured modulus of elasticity values vary from 90 to 760 hbars with 50% of the test pieces giving a value exceeding 550 hbars, the average being approximately 700 hbars. The dispersion of these results is essentially due to the fact that the composition of human bones is not homogeneous and varies between different points on the skull. As a function of these results, it was found that an epoxy resin was suitable for producing artificial craniums. In particular, it is possible to use an epoxy resin of the filled DGE BPA type, to which has been added an amine hardener. On the basis of these results, an equivalent resin thickness was determined so that the compression strength at a given point of the artificial cranium is equal to the compression strength at the corresponding point of the fresh cranium. On the basis of these equivalent thicknesses, a wax cranium was produced having the shape and dimensions of a real human cranium (except for the thickness adaptations). This wax cranium was used for producing the moulds for making the synthetic craniums in the process according to the invention.

The determination of the compression modulus of elasticity at different points on a fresh cranium will now be described with reference to FIGS. 1a to 1d, together with the determination of the equivalent epoxy resin thickness and the production of the wax model cranium.

Figure 1A:
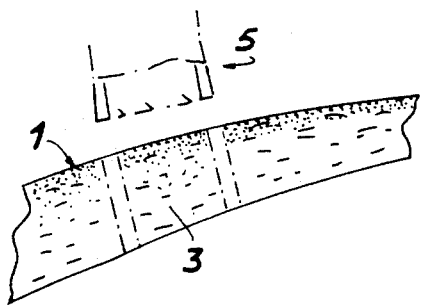
FIGS. 1a to 1d: Diagrammatic sectional views illustrating in a more detailed manner how stages (a) to (c) of the process for producing the artificial cranium are performed.

In the sectional view of FIG. 1a, initially a bone test piece 3 is removed from the bone wall 1 using a trephine. The test piece 3 is taken substantially perpendicularly to the bone wall 1 and its cross-section is circular, its diameter being e.g. approximately 8 mm. However, it is not possible to directly perform compression tests on the bone test piece 3, because the end faces of test pieces such as 3 are never parallel. Thus, the outer and inner faces of wall 1 are rarely parallel at a given point. Moreover, there are significant differences between individual points and it can occur that test pieces taken symmetrically (to within 1 or 2 mm) with respect to the plane of symmetry of the cranium are not identical. Thus, in order to be able to perform representative uniaxial compression tests, test pieces were produced of the type shown in FIG. 1b.

For this purpose, at each of the ends of test piece 3 are provided cylindrical elements 7, 9, which adapt perfectly to the shape of test piece 3, thus constituting a test piece 11 having the shape of a regular cylinder, whose diameter is that of test piece 3. In the tests performed, test pieces 11 had a height of 20 mm and a diameter of 8 mm, but it would not pass beyond the scope of the invention to use other values. Elements 7 and 9 can e.g. be made from araldite CW 216.

In this way a test piece was produced with a total height designated h, $h_o$ being the mean height of the bone part and $h_a$ the height of the remaining part defined by $h_a = h - h_o$. It is pointed out that due to the fact that the end faces of test pieces 3 are not parallel, their height is not constant. Thus, the mean value between the minimum and maximum heights is taken for $h_o$. The cross-section of the bone test piece may also not be constant and in this case in order to calculate the stress undergone when it is in compression, account is only taken of the minimum cross-section value.

Figure 1B:
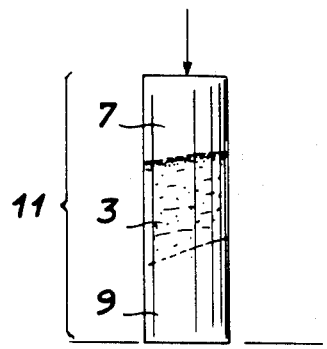

Test piece 3 is then placed under compression, as indicated by arrows F in FIG. 1b. Thus, the modulus of elasticity E of the complete test piece 11 is determined and the modulus of elasticity $E_o$ of the bone part is determined by the relation:

$$\frac{h_o}{E_o} = \frac{h}{E} - \frac{h_a}{E_a}$$

$E_a$ being the modulus of elasticity of elements 7 and 9 (e.g. 760 hbars in the case of araldite). This value can either already be known, or can be determined by a prior test. It was consequently possible to determine that the bones of the cranial case had modulus of elasticity values varying significantly from one point to the next, the minimum values being approximately 100 hbar and the maximum values approximately 800 hbar.

The following stage consists of the determination of the equivalent thicknesses of the material forming the artificial cranium, so that at a given point, the resistance to mechanical stressing is the same as that of the real bone. In order to produce the artificial cranium, it is possible to use resins of the type referred to hereinbefore having a compression modulus of elasticity of approximately 600 hbar. However, it is preferable to use a material having a modulus of elasticity in the range of the modulus values of the real bone.

The equivalent thickness $h_r$ of the resin is determined by the formula:

$$\frac{h_r}{h_o} = \frac{E_o}{E_r}$$

$E_r$ being the modulus of elasticity of the resin.

Figure 1C:
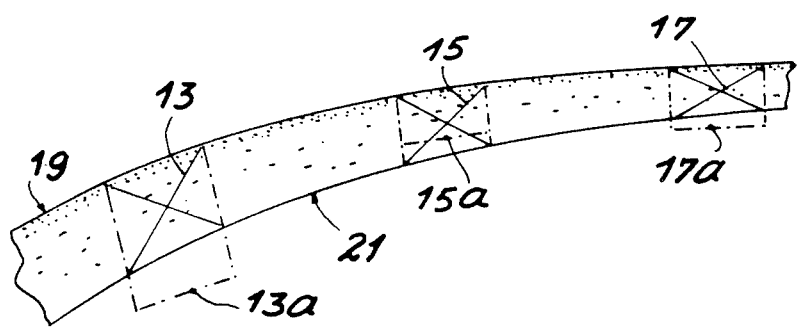

In the sectional view of FIG. 1c, continuous lines illustrate three test pieces 13, 15, 17 and mixed lines the equivalent resin thickness necessary to have the same compression strength. In this example, the resin elements 13a, 17a are thicker than test pieces 13, 17 and elements 15a thinner than test piece 15.

Figure 1D:
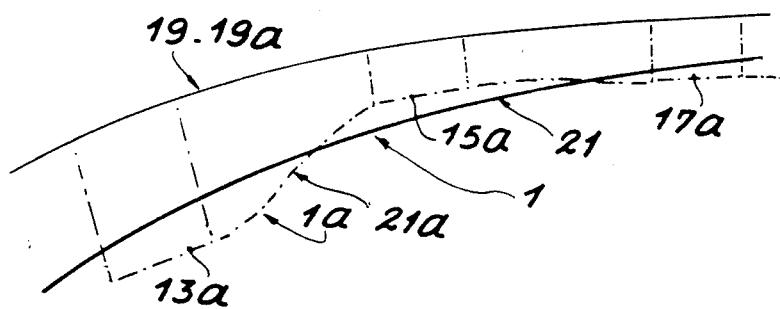

FIG. 1d shows in continuous line form the bone wall 1 of the real cranium, whilst the broken lines illustrate the corresponding wall 1a of the artificial cranium. Wall 1 has an outer face 19 and an inner face 21. It is pointed out that preferably the artificial cranium has the same external shape as the real cranium. Consequently the outer face 19a of wall 1a coincides with face 19. Its inner face 21a differs from face 21 and passes through the ends of elements 13a, 15a, 17a located inside the cranium.

It can occur that compression tests performed on a fresh craniium give widely varying results, even between points which are relatively close together. In this case, use is made of the mean value of the values obtained for determining the equivalent resin thickness. This is not prejudicial for the tests subsequently performed with the cranium or the prosthetic head produced therefrom. Thus, these are impact or shock tests for which there is no need for a great accuracy and the mechanical behaviour of the artificial cranium remains close to that of the real cranium.

The wax cranium used for producing the moulds and countermoulds employed in the invention has a shape, at a given zone, identical to that of wall 1a of FIG. 1d.

A description will now be given of the production of the artificial cranium according to the invention with reference to FIGS. 2 to 12.

Figure 2:
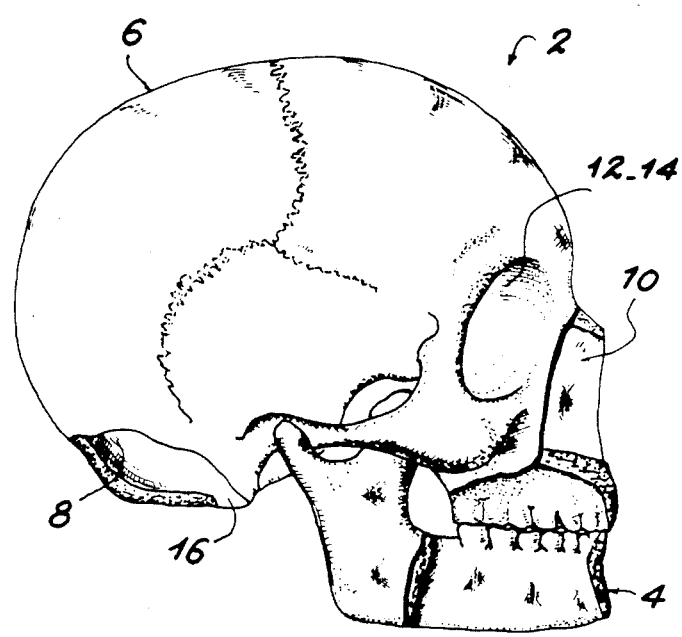
FIG. 2: A diagrammatic profile view of a human head.

FIG. 2 diagrammatically represents a human cranium 2 and which comprises two parts which are movable with respect to one another, namely a lower jawbone 4 and a cranial case 6. For easiness reasons, lower jawbone 4 and cranial case 6 are produced separately, because the jawbone has few reentrant angles, few undercuts and no cavity, so that it can easily be produced by moulding using conventional methods. It is more difficult to produce the cranial case, because it has a certain number of cavities, namely the cerebral cavity 8, nasal cavity 10 and orbital cavities 12, 14. These cavities communicate with the outside by holes which have a small diameter compared with their dimensions (cervical hole 16 for cerebral cavity 8), so that a special method had to be developed.

Before describing in detail the production of the cranial case with its different cavities, a description will be given of the production of the lower jawbone with reference to FIGS. 3 and 4. This operation essentially comprises two stages, firstly producing the mould from the wax jawbone and then producing the resin jawbone using said mould.

Figure 3:
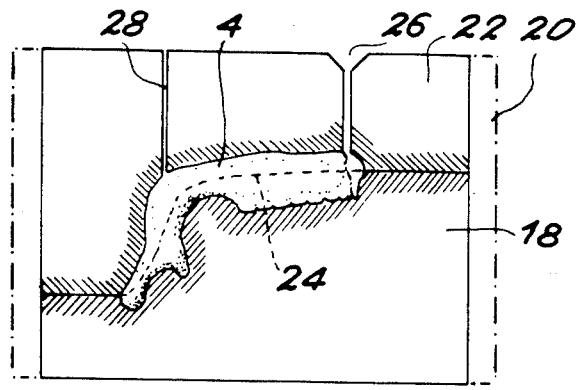
FIG. 3: A diagrammatic sectional view illustrating both the production of the mould for producing the lower jawbone and the production of the latter.

FIG. 3 shows that firstly the lower jawbone 4 is placed in a plaster material 18 within a container 20. The plaster material is fashioned before hardening, so that the joining plane follows a line corresponding approximately to half the height of the jawbone. Over the jawbone 4 and plaster material 18 is then poured material 22 which will form the first part of the mould taking as the joining plane the line referred to hereinbefore.

This is followed by the extraction of the wax jawbone 4 and the material 22 from the plaster material 18 and the operation is recommenced using material 22 as the lower support. It is also possible to proceed in the reverse order, material 22 constituting the upper part of the mould in which has been provided a pouring hole for resin 26 and a vent 28. In this case, which is illustrated in FIG. 3, material 18 is no longer the plaster material and is instead the other part of the mould. In order to produce the latter, preference is given to the use of a flexible material, e.g. silicone and in particular a silicone of type RTV, which facilitates mould removal. For example, it is possible to use the product marketed under the name RTV 1502 by RHONEPOULENC.

Figure 4:
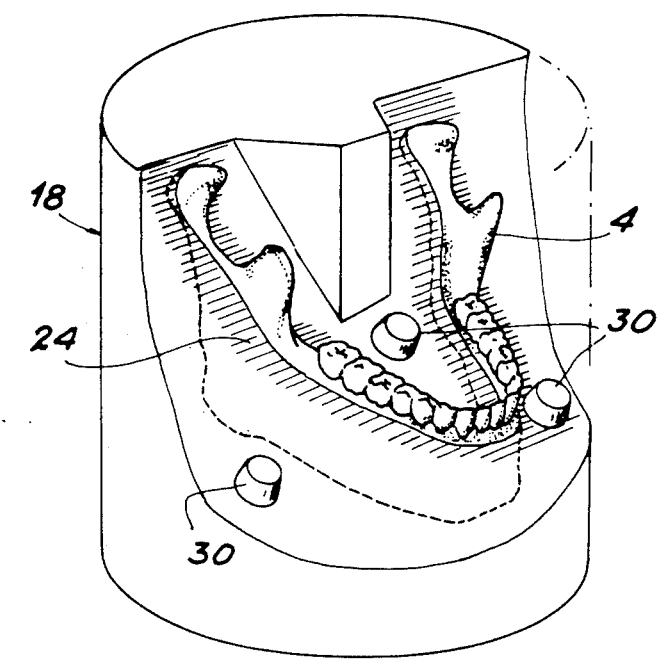
FIG. 4: A diagrammatic perspective view showing the lower jawbone before being extracted from its mould.

FIG. 4 shows the lower jawbone 4 as occurs in the lower part 18 of the mould following the hardening of the resin and after removing the upper part 22 of the mould. It is possible to see three centring pins 30 making it possible to position the two parts of the mould with respect to one another. In view of the flexibility of the material used, the operator can easily move apart the edges of the silicone material of jawbone 4 by simply exerting pressure with the fingers, which facilitates extraction thereof.

A description will now be given of the production of the moulds and countermoulds used for producing the resin cranial case, said moulds and countermoulds being produced from impressions taken of the wax cranium.

Figure 5:
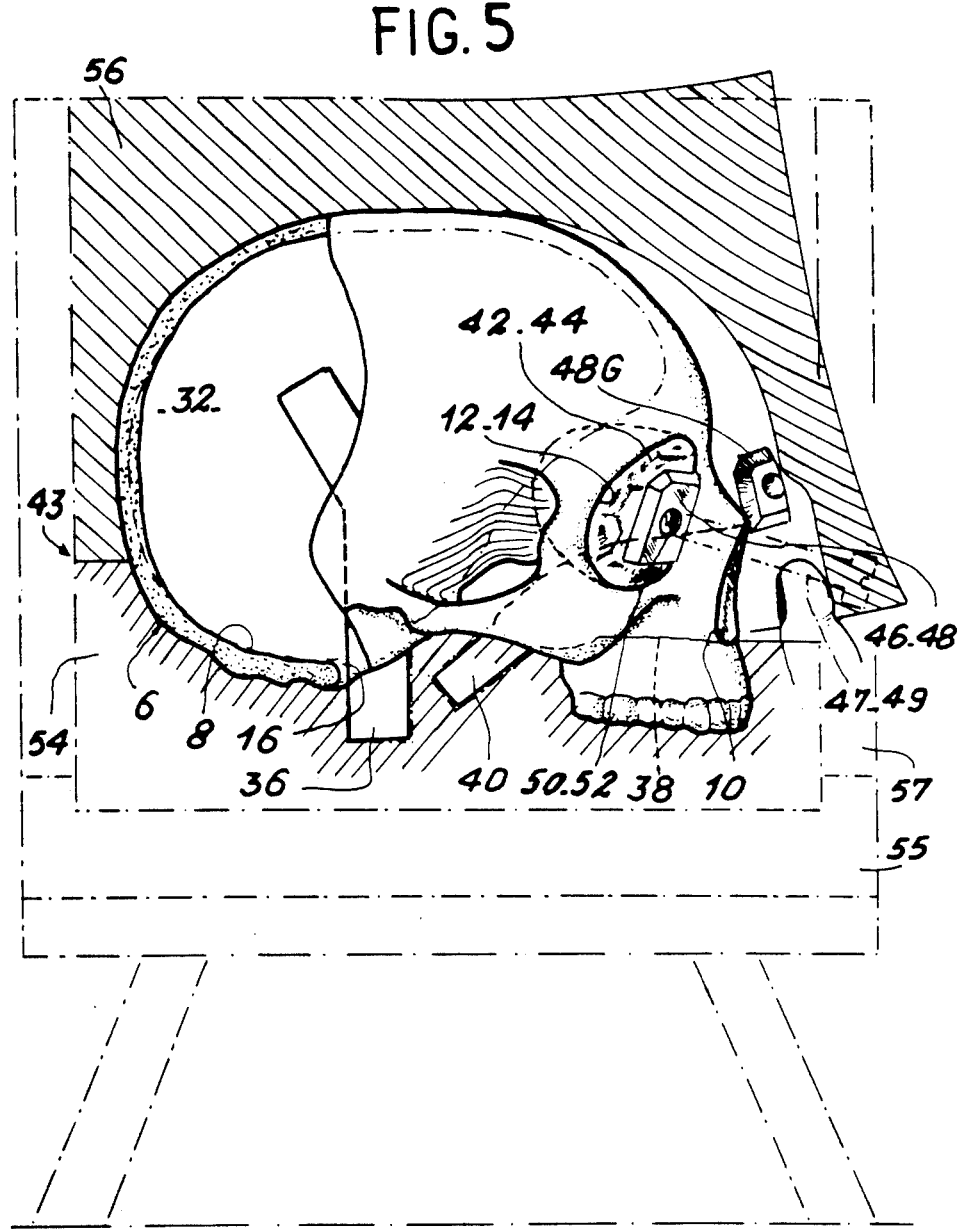
FIG. 5: A diagrammatic sectional view illustrating the production of the mould and cores defining the cavities with the aid of a model head.

As can be seen in FIG. 5, initially the cerebral cavity 8 of the wax cranial case 6 is filled with a mass 32 of a product, which can be that used for producing the lower jawbone. This mass is introduced in liquid form through the cervical holes 16 and, still through the latter, a positioning means 36 is introduced and in the presently described example it is constituted by a rigid rod having a square cross-section. In the same way, into the nasal cavity 10 is introduced a mass 38 of the same product, together with a positioning rod 40 which is also rigid and has a square cross-section. Finally, into the orbital cavities 12, 14 are introduced cores 42, 44, which are advantageously also made from silicone. FIG. 5 shows that in cores 42, 44 are placed plates 46, 48, each provided with a tapped hole 50, 52 respectively. The function of these perforated plates will be explained hereinafter in connection with the description of the production of a resin cranium.

Once the cores 32, 38, 42, 44 have been fitted, the mould of the external part of the cranial case is produced. This mould 43 comprises a lower part 54 and an upper part 56; it being produced in known manner by taking as the joining plane a line passing through the zygomatic process. Elements 54 and 56 are produced by pouring silicone into a container constituted by a base 55 surmounted by a cylindrical sleeve 57. Mould removal is extremely easy due to the flexibility of this material, as can be seen in the right-hand part of FIG. 5. By simple finger pressure, the operator is able to deform part of the upper mould 56 to disengage it from the cranium.

FIG. 5 also shows that during the production of the lower part 54 of the mould, the ends of rods 36 and 40 are located outside the cerebral and nasal cavities and are consequently set in the silicone mass constituting the lower part 54 of the mould. Following the extraction of the latter, said rods leave traces 37, 41 respectively (cf. FIG. 11a) which will be used for the positioning of the cores during the production of the resin cranium. When elements 54 and 56 have hardened, they are extracted whilst deforming them if necessary. The wax cranium is then destroyed so as to recover core 32 equipped with its positioning rod 36, together with core 38 equipped with its positioning rod 40. Extraction also takes place of the orbital cores 42, 44 equipped with plates 46, 48. An impression is now taken of cores 32 and 38 in order to produce the countermoulds, which will subsequently be used for producing the soluble cores defining the cerebral and nasal cavities of the cranium to be produced. In a conventional manner, said impressions are taken in two parts.

A description will now be given of the production of an artificial resin cranium with reference to FIGS. 6 to 12.

Figure 6:
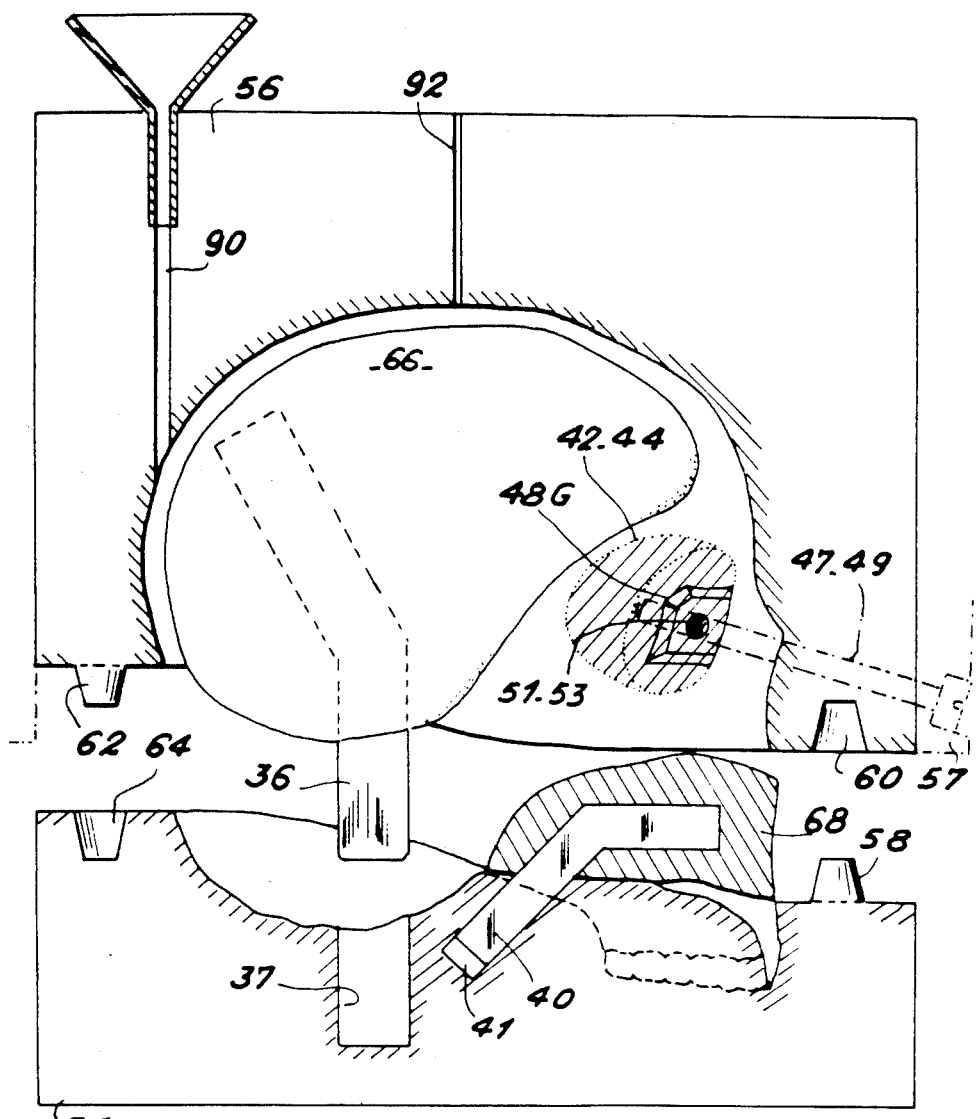
FIG. 6: A diagrammatic sectional view illustrating the placement of the mould and cores used for producing an artificial head.

FIG. 6 shows the lower part 54 of the mould having one or more centring pins 58, which are to be received in corresponding holes 60 of the upper part 56. The latter is equipped with one or more centring pins 62 received in the correspondingly shaped holes 64 provided on lower part 54. The first stage consists of producing a cerebral core 66 and a nasal core 68 made from a material which can be dissolved in a solvent which does not dissolve resin. For this purpose, it is possible to use a mineral or organic salt which is soluble in water, e.g. sodium thiosulphate to which glucose has been added, potassium alum, etc., because the resin is not soluble in water.

FIGS. 7a and 7b show that the countermould 70 of the cerebral cavity comprises two parts 72, 74, which can be assembled by centring pins 76 received in holes 78. After producing the countermould 70 with the aid of core 32 poured into the wax cranium, positioning rod 36 is maintained in place, so that the countermould 70 has a passage 80.

The cerebral core is produced as follows. Countermould 70 is closed and the necessary quantity of soluble material is introduced into cavity 82, which is in two parts 82a, 86b corresponding to the two parts 72, 74 of countermould 70. The positioning rod 36 is then introduced into recess 80, which is also in two parts. It should be noted that this rod 36 is not necessarily the same as that used for producing the initial impressions with the wax cranium and it is merely necessary that it has the same geometry.

As illustrated in FIG. 8, the countermould is then moved in all directions, in order that the material covers the inner walls of cavity 82 and forms a film which solidifies during said movement, in order to obtain hollow cores in the manner illustrated in FIG. 7b. Thus, in view of the fact that core 66 will be subsequently eliminated by dissolving in water, this method makes it possible to save material. The nasal core 68 is made in the same way in a countermould 84 in two parts 86, 88 (FIG. 9). The latter are reciprocally positioned with the aid of centring pins 87 received in holes 89. However, in view of the fact that the volume of the nasal cavity is much smaller than that of the cerebral cavity, it would serve no purpose in this case to operate in the same way in order to obtain a hollow shell. Preferably rod 40 is not a fitted rod and is made from the same soluble material as core 68, so as to facilitate the extraction of the resin cranium once it has been completed.

On again referring to FIG. 6, it can be seen that after producing the cerebral core 66 and the nasal core 68, both being integral with their positioning rods 36, 40 respectively, the latter are placed in recesses 37, 41 of the lower part 54 of the mould. As rods 36 and 40 have the same geometry as those used during the taking of impressions with the aid of the wax cranium (FIG. 5), the nasal core 68 and cerebral core 66 are automatically in the correct position.

This is followed by the fitting of the orbital cores 42, 44 equipped with their plates 46, 48, which are respectively held in place by screws 47 and 49. The latter are screwed from the outside of the upper part 56 of the mould whilst passing through holes 51, 53 provided for this purpose. Holes 51, 53 were produced at the time of taking the impressions of the wax cranium illustrated in FIG. 5. Moreover, plates 46, 48 have been positioned in such a way that they have left marks on the inner surface of the upper part 56 of mould 43. FIGS. 5 and 6 show mark 48G corresponding to the left-hand orbital cavity. These marks constitute recesses making it possible to correctly orient the orbital cores before pouring or casting the resin.

FIG. 6 also shows that the upper part 56 of the mould has a hole 90 for casting the resin, as well as a vent 92. Once the two parts 54, 56 of the mould have been assembled, the resin is poured through hole 90 and when all the gaps between the different cores and the outer parts of the mould have been filled, the resin is allowed to harden.

Figure 10:
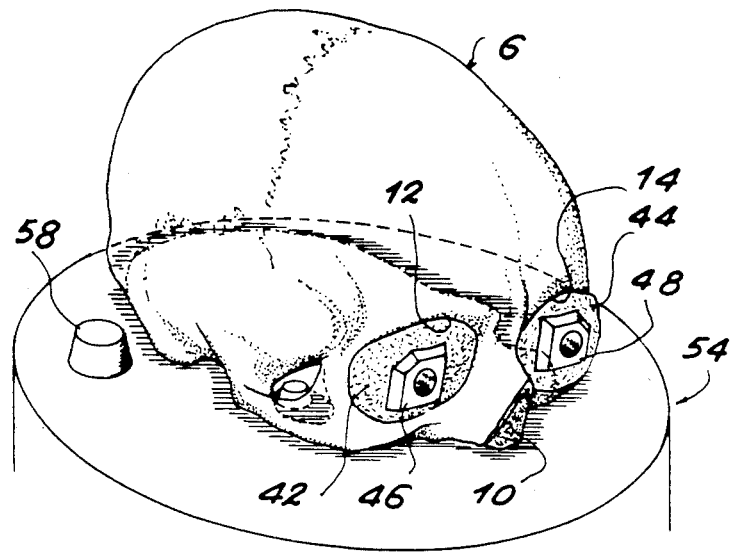
FIG. 10: A diagrammatic perspective view illustrating the finished artificial cranium, the lower part thereof still being located in the lower part of the mould.
Figure 11:
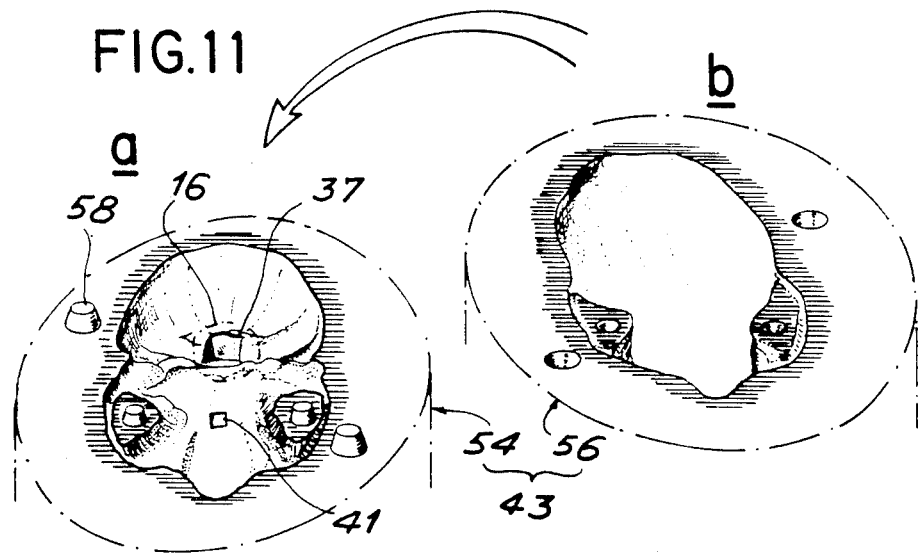
FIGS. 11a and 11b: Diagrammatic perspective views respectively illustrating the lower and upper parts of the mould used for determining the external shape of the cranium.

Once the resin has hardened, screws 47, 49 are removed, as is the upper part 56 of the mould. Thus, the situation of FIG. 10 is arrived at, where the lower part of the artificial cranium is located in the lower part 54 of the mould, whilst the orbital cores 42, 44 with their plates 46, 48 are still in the orbits. As the orbital cores are made from silicone, it is easy to extract them manually due to the flexibility of said material. The cranial case is then extracted from the lower part of the mould. It is also possible to proceed in the reverse order and firstly remove the lower part 54 of the mould. This is followed by the removal of the positioning rod from the core corresponding to the cerebral cavity because the adhesive force is relatively low. The cranial case is then placed under a stream of hot water, in order to dissolve the soluble core corresponding to the cerebral cavity and the core corresponding to the nasal cavity.

Figure 12C:
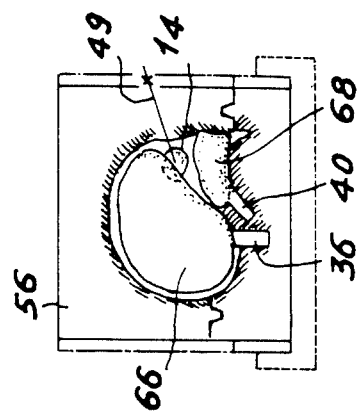
FIGS. 12 to 12f: Diagrammatic views illustrating the different stages in the production of an artificial cranium according to the invention.
Figure 12F:
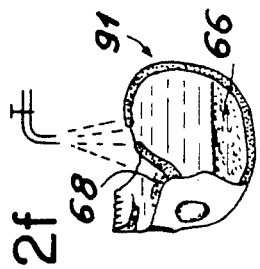
Figure 12B:
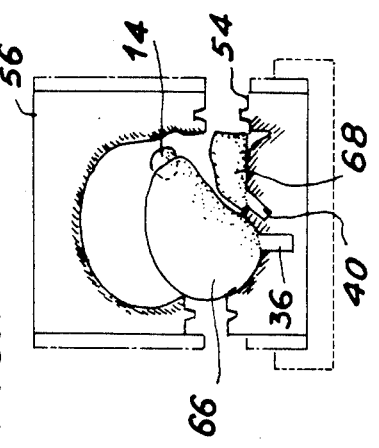
Figure 12E:
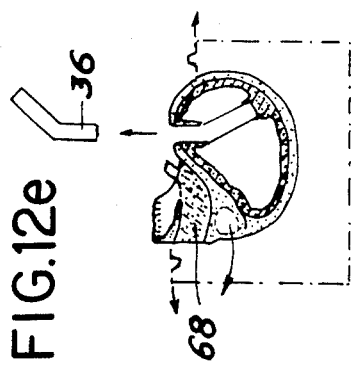
Figure 12A:
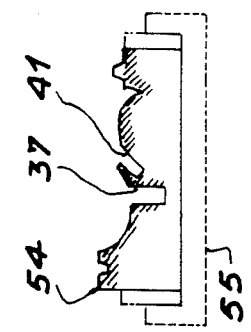
Figure 12D:
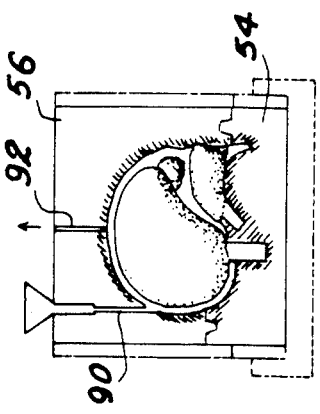

FIGS. 12a to 12f summarize the different stages of the process according to the invention. FIG. 12a shows that the lower part 54 of the mould is firstly placed in base 55, the part 54 having recesses 37 and 41 for the positioning rods of the cerebral core and nasal core respectively. Once the latter have been produced in their countermoulds, as has been described with reference to FIGS. 7 to 9, the cerebral core 66 is fitted by introducing its rod 36 into recess 37 and the nasal core 68 by introducing its positioning rod 40 into recess 41 (FIG. 12b). The upper part 56 of the mould is then introduced and in it are fixed the orbital cores 12, 14 using screws 47, 49 (FIG. 12c). The two mould parts 54, 56 are also fixed to one another. Resin is then poured through hole 90, whilst gases escape through the vent hole 92 (FIG. 12d). Once the resin has hardened, the two parts of the mould are separated and the screws holding the orbital cores are withdrawn. Easy withdrawal of rod 36 is possible, because it does not strongly adhere to the core 66 (FIG. 12e). When the finished cranial case 91 is extracted from the mould, hot water is introduced into the cerebral cavity and the nasal cavity (FIG. 12f), in order to dissolve the cerebral core 66 and nasal core 68. All that is then necessary is a finishing or deburring process, so as to give the cranial case its final appearance.

It is pointed out that it is not necessary to determine the compression modulus of elasticity at different points of a fresh cranium and to produce a model cranium on each occasion when an artificial cranium is to be produced.

Thus, after the mould and countermould have been produced, they can be used several times for producing a complete series of artificial craniums, i.e. stages (h) to (n) can be repeated several times without it being necessary to repeat stages (a) to (g).

Figure 14:
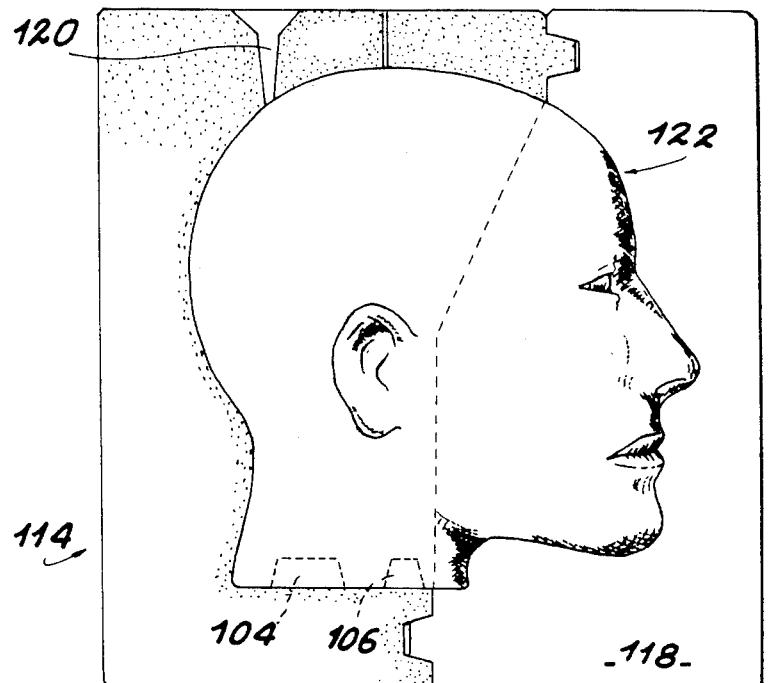
FIG. 14: A diagrammatic elevation view showing the finished prosthetic head prior to mould removal thereof.

A description will now be given of the production of a prosthetic head according to the invention with reference to FIGS. 13 to 15. For this purpose, a cranium 94 (FIG. 13) is firstly produced in accordance with the method described hereinbefore.

The following stage consists of placing a certain number of soft parts on said cranium. It is pointed out that the term "soft parts" is used to designate the non-bony parts of the head, i.e. essentially the brain, eyeballs, nose, ears and skin. In order to produce said soft parts, use is made of a material having the same hardness as the corresponding soft part of a real head. The determination of the hardness of the soft parts can take place directly on a living person with regards to the skin, ears and nose or during a a surgical operation with regards to the brains and eyeballs. This determination can be carried out with a durometer.

In the preferred embodiment of the invention, use is made of a silicone to which oil has been added, the hardness being adjusted by varying the oil quantity in the mixture. For example, it is possible to use silicone RHODORSIL RTV 11 504 A and oil 47 V 50 marketed by Rhone Poulenc. This RTV is a two-component silicone elastomer crosslinking at ambient temperature under the action of catalyst 11 032 also marketed by Rhone Poulenc. No inhibition phenomenon occurs during the polymerization of this RTV and the product obtained has a flexibility on elongation and a tearing strength.

The silicone-oil mixture can be produced with the aid of a slow agitator. The oil proportion in the mixture can be varied as a function of the hardness to be obtained. With the products mentioned hereinbefore, the proportions are as follows:
for the eyeballs: 3 g of silicone and 1 g of oil;
for the cartilaginous nasal pyramid: 5 g of silicone and 1 g of oil;
for the flats of the ears; 2 g of silicone and 1 g of oil;
for the brains: equal quantities by weight of silicone and oil;
for the skin: 2.5 g of silicone and 1 g of oil.

Figure 13:
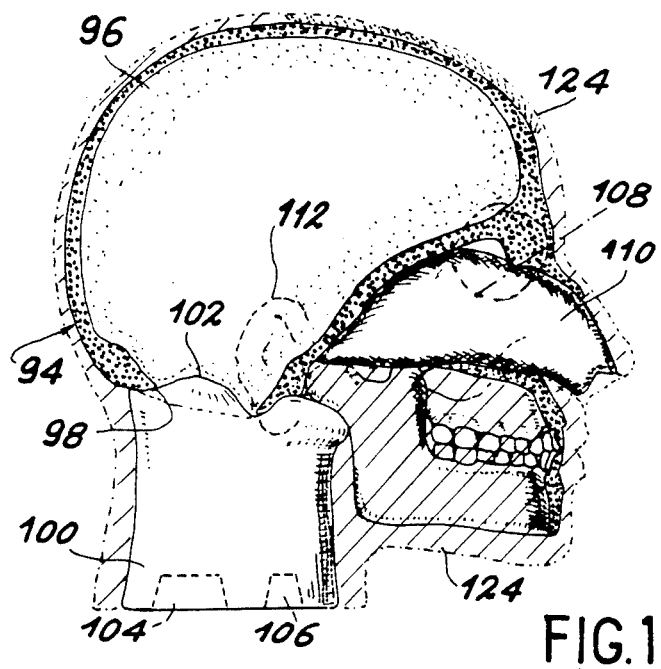
FIG. 13: A diagrammatic sectional view illustrating the production of a prosthetic head from the cranium according to the invention.

On referring to FIG. 13, it can be seen that the first operation consists of placing the brains 96 in the cranial case by pouring the aforementioned mixture through the occipital foramen 98 until the cerebral cavity is completely filled.

The cranium is then placed on a substantially cylindrical vertebral support 100 and whose shape corresponds to that of a neck (less the thickness of the skin). FIG. 13 shows that this vertebral support is provided in its upper part with a boss 102, whose shape corresponds to that of the occipital foramen. The upper part of support 100 is shaped in such a way that it adapts to the occipital foramen and the adjacent region over a width of approximately 2 cm. Thus, when in the vertical position illustrated in FIG. 13, the cranium rests thereon with the same orientation as a real cranium with respect to a neck. FIG. 13 shows that the vertebral support 100 is provided in its lower part with two holes 104, 106. These holes (female parts) are intended to match correspondingly shaped male parts provided in the subsequently used mould for casting the material simulating the skin, in order to bring about a good orientation of the support-cranium assembly with respect to the mould. In the examples produced, there was a first conical hole with a diameter of 15 mm and a depth of 15 mm and a second rectangular parallelepipedic hole of 5 cm × 1.5 cm × 1.5 cm. However, it would not pass beyond the scope of the invention to use holes having different shapes and dimensions or using other means for orienting support 100 with respect to the mould.

In the general case of producing a head comprising not only the cranium, but also at least part of the neck, the materials simulating the skin is cast not only round the cranium, but also round the vertebral support 100. Thus, the latter cannot be reused and it is necessary to have one support per head. The support can be produced by moulding in the conventional way by producing an e.g. wax model and the taking of impressions of said model in two stages permitting the production of a two-part mould in which all the supports will be cast. The latter are preferably made from epoxy resin.

Once the cranium 94 containing the brains 96 has been placed on the vertebral support 100, the eyeballs 108 are placed in the orbital cavities, the nasal pyramid 110 in the nasal cavity and the flats of the ears 112 on the temples. These different elements can be obtained by moulding in the conventional manner in a mould produced by taking impressions of a wax model. It is necessary to have a mould for the nasal pyramid, a mould for each of the two ears and a mould for each eyeball. These different members are made from a silicone to which oil has been added, as indicated hereinbefore.

In the case of the aforementioned products, the thus obtained soft parts have the advantage of being able to stick directly to the epoxy resin forming the cranium 94. However, it would not pass beyond the scope of the invention to use other fixing means.

Once all these elements have been fitted, cranium 94 with its support 100 is placed in a mould 114 (FIG. 14), which is in two parts 116, 118. The holes 104, 106 of support 100 are engaged on the correspondingly shaped and not shown male parts provided on mould part 116. After closing mould 114 by assembling its two parts 116, 118, the material simulating the skin is poured through the hole 120 provided for this purpose. It is allowed to harden and the finished head 122 extracted. FIG. 13 shows the external contour of the skin (consequently the finished head) by the mixed line 124. The weight of the thus produced prosthetic head is approximately 4.8 kg.

Mould 114 can be produced as follows. Firstly a cranium is produced by the aforementioned process, together with a vertebral support 100, like that illustrated in FIG. 13. It would optionally be possible to take a differently produced cranium, but its external shape must be the same as that of the artificial craniums to be subsequently used. Everything is then covered with a material which can be sculptured, e.g. wax. The latter is then fashioned in such a way as to give it the shape and external dimensions of a real head. It should be noted that during this operation, the wax fills the orbital cavities and nasal cavity. Measurements performed on living persons have revealed the following average dimensions:
total head height: 21.5 cm,
height of the neck below the mandible: 2.5 cm,
neck diameter: 9 cm,
neck perimeter: 29 cm,
head width in the mastoid region: 15 cm,
head width with ears: 18 cm,
spacing between ears and mastoid: 1.5 cm,
length of ears: 6 cm,
width of profile head: 22 cm,
thickness of frontal integuments: 6 mm,
thickness of parietal integuments: 8 mm,
thickness of occipital integuments: 7 mm,
thickness of the region of the tubercles: 8 mm,
integument thickness at the mandiubular angles: 1 cm,
integument thickness at the symphysis: 1.2 cm,
integument thickness at the cheeks: 1.5 cm,
depth of osseous orbits: 5.4 cm.

The average dimensions of the nose are as follows: agger 5.5 cm, height 5 cm and depth 3 cm.

An impression in two parts is then taken of this wax head in order to obtain the two parts 116, 118 of mould 114, which can be of silicone RTV 1502, like the mould used for producing the cranium.

It should be noted that the vertebral support 100 used for producing the wax model head has left a mark in at least one of the parts of mould 114 and can be in the form of the male parts corresponding to the holes provided in the support. In order that subsequently all the craniums used for producing the prosthetic heads are well oriented in mould 114, it is necessary for all the supports used to be identical to that for producing mould 114. Thus, it is either necessary to take the impression of the initial vertebral support to obtain the mould in which the other supports will be cast or to produce all said supports in a single, already existing mould.

Once the mould 114 has been produced from the wax head, the latter can be destroyed and the prosthetic heads can be produced by the aforementioned method, or alternatively the wax can be eliminated (e.g. by heating it to dissolve it), followed by the recovery of the cranium used for producing the model head.

Figure 15:
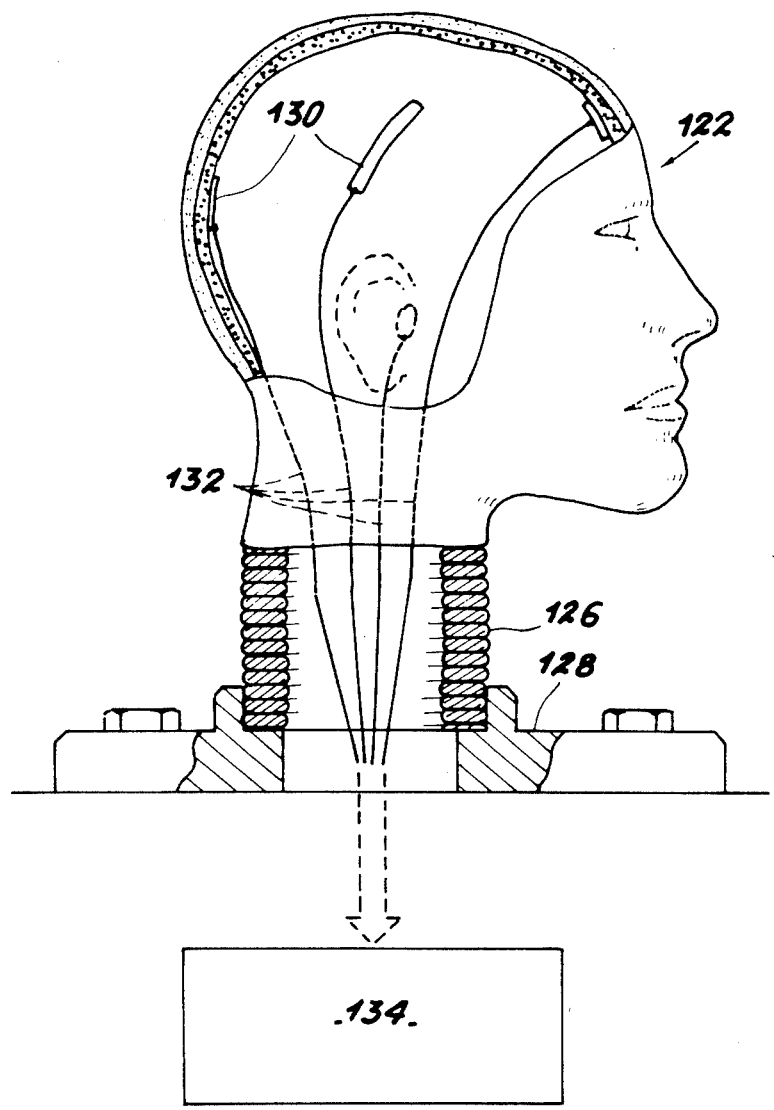
FIG. 15: A diagrammatic elevation view showing how it is possible to position the different sensors within the prosthetic head.

FIG. 15 illustrates an arrangement making it possible to perform mechanical tests on a prosthetic head produced according to the invention. It can be seen that head 122 rests on a flexible support 126 via the vertebral support (not shown in FIG. 15). Flexible support 126 is fixed by its lower part to a base 128. Support 126 has the same flexibility as a real neck and consequently under the action of a given stress, head 122 moves in the same way as a real head.

In the case of the arrangement of FIG. 15, head 122 is subject to shocks in order to determine the lesions caused by a shock of a given intensity and it is also possible to test the effectiveness of certain protective means (helmets for motorcyclists and motorists). The different parts of the prosthetic head (except the vertebral support) have the same mechanical strength as the corresponding parts of a real head, so that the lesions caused on the prosthetic head are substantially the same as those which would be caused on a real head for an identical stress. It is therefore possible to establish in which cases the lesions only affect the skin or the skin and the bones or the skin, bones and brain, whilst defining the points at which the lesions are most serious.

FIG. 15 shows that it is possible to place within head 122 one or more sensors 130 connected by wires 132 to a measuring apparatus 134. These sensors can be located at a random point within the head, e.g. within the brains, an osseous mass, the skin or another soft part, or alternatively in the contact area between two different parts. It is merely necessary to position the sensor at the desired point before casting a given part of the head or incorporate these in a soft part during the production of the latter. These sensors give information on the stresses suffered as a result of a shock or external vibrations (e.g. intense noise) and determine the stresses or accelerations at points other than the initial shock point.

The process according to the invention has particularly interesting advantages, because it makes it possible to easily produce an artificial cranium having the shape, dimensions and mechanical characteristics of a real human cranium. Such craniums are perfectly adapted to the study of behaviour in the case of an impact, which would be impossible with the presently produced artificial craniums formed from two or more parts fitted into one another and which do not reproduce the real configuration of a human cranium.

Furthermore, the process according to the invention makes it possible to easily produce a complete head with the same mechanical behaviour as a real head. It is therefore possible to obtain reliable information on the consequences of an external stress such as an impact, a noise or a random vibration. It is possible to establish the type of lesion caused under given conditions and obtain information on the precise locations where the lesions are produced. This is impossible with the prior art means, such as a honeycomb structure placed within an envelope reproducing the shape of a head. Knowing the type of lesion and the locations where such lesions occur, the invention also makes it possible to develop protective means (e.g. helmets for motorcyclists) and test the effectiveness of these protective means.

Obviously the invention is not limited to the embodiments described hereinbefore and numerous variants thereof can be envisaged without passing beyond the scope of the invention. Thus, the materials from which the moulds, cores or countermoulds are made can be varied at random. However, it is preferable to choose a flexible material for the moulds in order to facilitate mould extraction. Finally, although in the given embodiment a wax cranium and wax head were used as models for producing the initial moulds, it is also possible to use one of the resin craniums or one of the prosthetic heads according to the invention for producing other moulds and other countermoulds.

What is claimed is:
1. A process for producing an artificial cranium by moulding a first material in a mould which is in several parts, said cranium having at least one cavity, wherein it comprises the following stages:
   (a) determining the compression modulus of elasticity at different points of a fresh cranium,
   (b) calculating the equivalent thicknesses of the first material, so that the compression strength is the same at each considered point,
   (c) producing a model cranium with the thus calculated equivalent thicknesses, said model cranium having a cavity corresponding to that of the cranium to be produced,
   (d) taking an external impression of the model cranium in two stages in order to obtain a two-part mould,

(e) taking an impression of the cavity of the model cranium in order to obtain a first core, stages (d) and (e) being performed simultaneously,
(f) eliminating the model cranium,
(g) taking an impression of the first core to obtain a countermould,
(h) producing in said countermould a second core of a second material, which can be selectively eliminated with respect to the first,
(i) placing the second core in one of the mould parts by orienting it using appropriate positioning means,
(j) closing the mould by assembling its different parts,
(k) introducing the first material into the mould,
(l) allowing the first material to harden,
(m) separating the different parts of the mould, and
(n) eliminating the second core.

2. A process according to claim 1 wherein stage (a) comprises:
(1) sampling a piece of bone of substantially cylindrical section and with an axis substantially perpendicular to the bone wall at several points of the fresh cranium, where the compression modulus of elasticity is to be determined,
(2) producing from said bone a test piece, the test piece having the shape of a regular cylinder with the same cross-section as the piece of bone and produced by fixing to the bone at least one member made from a material whose compression modulus of elasticity is known,
(3) subjecting the test piece to a compressive force test, and
(4) determining the compression modulus of elasticity of the bone test piece on the basis of the results of this test.

3. A process according to claim 1, wherein the cranium to be produced has at least one orbital cavity, the process also comprises the following stages, performed before stage (j) and comprising
(o) producing an orbital core from a third material,
(p) mounting a rigid member having a tapped hole on the orbital core,
(q) placing the orbital core within one of the parts of the mould, the rigid member being received in a recess provided for this purpose, and
(r) fixing the orbital core with the aid of a screw entering from the outside of said mould part, through a hole provided for this purpose and extending into said tapped hole.

4. A process according to claim 3, wherein it also comprises the following stages performed after stage (b):
(s) removing the screw, and
(t) extracting the orbital core from the orbital cavity.

5. A process according to claim 1, wherein the artificial cranium comprises a lower jawbone and a cranial case having at least one cavity, so that the lower jawbone and cranial case are produced separately by moulding.

6. A process according to claim 1, wherein the first material is an epoxy resin.

7. A process according to claim 1, wherein the material from which the mould, countermould and/or first core are made are silicones.

8. A process for the production of a prosthetic head, wherein it comprises the following stages:
(5) producing an artificial cranium by the process of claim 1,
(6) placing this cranium in a two-part mould, whilst orienting it by a positioning means,
(7) pouring a material simulating the skin into the mould,
(8) allowing said material to harden,
(9) separating the two parts of the mould, and
(10) extracting the finished head.

9. A process according to claim 8, wherein it comprises a supplementary stage performed before stage (6) and consisting of placing at a given point of the cranium, a soft part made from a material having the same shape and mechanical strength characteristics as the corresponding soft part of a real head.

10. A process according to claim 8, wherein silicone mixed with oil is used as the material for said soft part.

11. A process according to claim 10, wherein the oil quantity in the mixture is varied, so that the hardness of said soft part is identical to that of the corresponding soft part of a real head.

12. A process according to claim 8, wherein as the cranium has an occipital foramen, the positioning means is constituted by a support provided at one of its ends with a shape adapted to that of the cranium in the vicinity of the occipital foramen and the other end has orientation means able to cooperate with corresponding orientation means provided in the mould.

13. A process according to claim 12, wherein the production of said support comprises the following stages:
producing a substantially cylindrical model support having at one of its ends a shape such that the cranium can rest on said model support, when the latter is in the vertical position, with the same orientation as a real cranium with respect to a neck and at the other end at least one orientation means,
taking an impression of the model support in two parts in order to produce a countermould, and
producing the support by moulding its constituent material in the countermould.

14. A process according to claim 8, wherein the production of the mould comprises the following stages:
producing a cranium having the same external appearance as that used for producing the prosthetic head,
placing said cranium on a positioning means identical to that used in stage (6),
externally covering said cranium and said positioning means with a material which can be sculptured,
sculpturing said material to give it the shape and external dimensions of a real head, thus forming a model head, and
taking an impression of said model head in two stages, so as to produce the mould.

15. A process according to claim 8, wherein it comprises a supplementary stage performed before stage (3) and consisting of placing a measuring sensor at a given point on the head.

* * * * *